March 23, 1948. C. J. MALHIOT 2,438,178
MECHANISM FOR CONVEYING, DISCHARGING, AND ASSORTING WRAPPED ARTICLES
Original Filed May 8, 1942 9 Sheets-Sheet 7

March 23, 1948. C. J. MALHIOT 2,438,178
MECHANISM FOR CONVEYING, DISCHARGING, AND ASSORTING WRAPPED ARTICLES
Original Filed May 8, 1942 9 Sheets-Sheet 9

Inventor
Clarence J. Malhiot

Patented Mar. 23, 1948

2,438,178

UNITED STATES PATENT OFFICE 2,438,178

MECHANISM FOR CONVEYING, DISCHARGING, AND ASSORTING WRAPPED ARTICLES

Clarence J. Mathiot, Oak Park, Ill., assignor to F. B. Redington Co., Chicago, Ill., a corporation of Illinois Original application May 8, 1942, Serial No. 442,205. Divided and this application September 9, 1944, Serial No. 553,450

17 Claims. (Cl. 209—72)

This invention relates generally to article conveying and discharging mechanism and particularly to mechanism for conveying articles which are especialy small and thin, such as razor blades. This application is a division of a copending application filed by the same applicant on May 8, 1942, as Serial No. 442,205.

One of the principal objects of the invention is to provide new and novel means for conveying and discharging articles being wrapped, such as razor blades, at a constant high speed. Another object of the invention is the provision of improved means for discharging the wrapped articles to a predetermined unloading position, and for discharging damaged articles at a different predetermined position.

A further object of the invention is to provide conveying and discharging mechanism to permit the complete wrapping and discharge of the article while traveling in a substantial straight line.

These and other objects will be apparent from the following description, the appended claims and the accompanying drawings, which illustrate a selected embodiment of the invention, and in which:

Fig. 4 is a plan view of the apparatus shown in Fig. 2;

Like characters of reference indicate the corresponding parts in the different views of this application as well as designating the same parts in the aforesaid co-pending application, Serial No. 442,205.

The particular machine herein shown for the purpose of illustrating the invention comprises a vertical main frame 1 which extends longitudinally of the machine and supports the various operating parts thereof.

*Article conveying mechanism*

Figures 6, 7, 8:
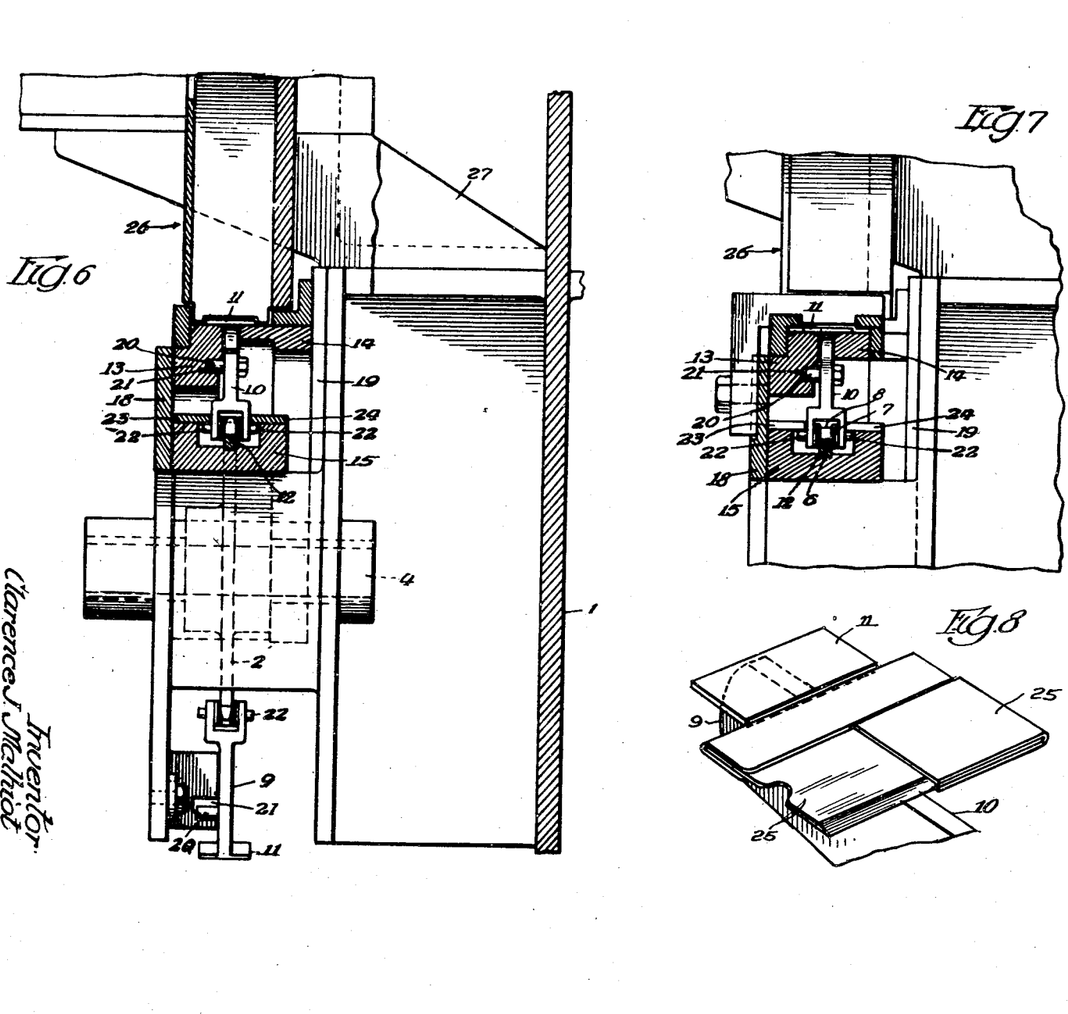
Fig. 6 is a sectional detail taken along the line 6—6 of Figs. 3 and 5.
Fig. 7 is a sectional detail taken along the line 7—7 of Fig. 3.
Fig. 8 is a perspective view illustrating the manner in which a pusher element engages an article in accordance with the present invention.

A pair of sprockets 2 and 3 are mounted upon shafts 4 and 5, which are suitably supported upon main frame 1, and these sprockets carry a conveyor chain 6. The chain 6 comprises a plurality of links 7 pivotally joined together with rollers 8, Fig. 7, therebetween.

A plurality of substantially T-shaped article advancing or pusher members 9 are pivotally connected to the conveyor chain 6. Each of the pusher elements 9 comprises a stem portion 10, Figs. 6 and 7, and a pusher portion 11. Each pusher portion co-acts with the article 25, such as a razor blade, to be wrapped in the manner shown in Fig. 8. The pusher elements 9 travel along guide rails 12, 13 and 14 during operative movement. Guide rail 12 is mounted in a substantially U-shaped channel 15 which extends between the upper portions of the sprockets 2 and 3 and is supported at the left hand end of the machine by a U-shaped bracket 16, Fig. 5, and at the right hand end of the machine by a T-shaped bracket 17, Fig. 9. The rollers 8 of the conveyor chain are adapted to travel along the upper surface of the guide rail 12 and to be guided thereby.

Figure 9:
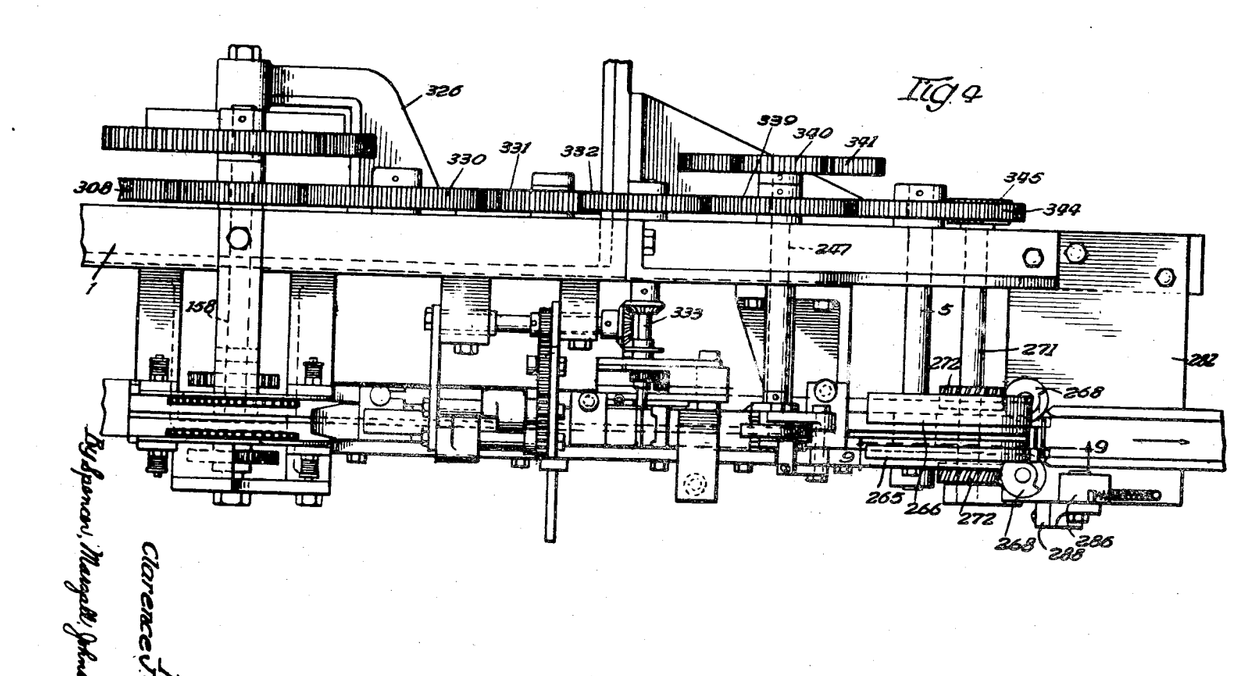
Fig. 9 is a fragmentary longitudinal section taken at the right hand end of the machine as indicated by the line 9—9 of Figs. 4, 10 and 11.
Figure 10:
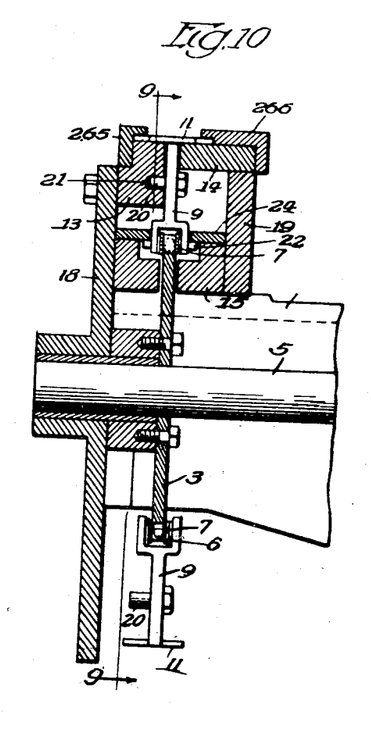
Fig. 10 is a transverse sectional detail taken on the line 10—10 of Fig. 9.

The guide rails 13 and 14 are suitably attached to side plates 18 and 19 which extend throughout the length of the machine. The guide rails 13 and 14 provide a table for supporting the article 25, such as a razor blade, to be wrapped, and also as a guide for the upper portions 11 of the pusher members 9. These guide rails extend from a position adjacent the lower end of the left hand sprocket 2, as shown in Fig. 5, to a position adjacent the lower end of the sprocket 3, as shown in Fig. 9.

Each of the pusher members 9 is also provided with a pin 20 which is adapted to ride within a cam groove 21 provided in the guide rail 13. The cam groove 21 extends throughout the length of the guide rail 13 and provides for constantly controlling the pusher elements during the operative portion of their movement. A pivot pin 22 also extends outwardly from the pusher members 9 and is received beneath a pair of guide plates 23 and 24 mounted upon the channel member 15. The guide rails 12, 13 and 14 together with the pins 20 and 22, the cam groove 21 and the guide plates 23 and 24 provide for maintaining the pusher members always in proper position, Figs. 5, 6, 7 and 9.

Figure 5:
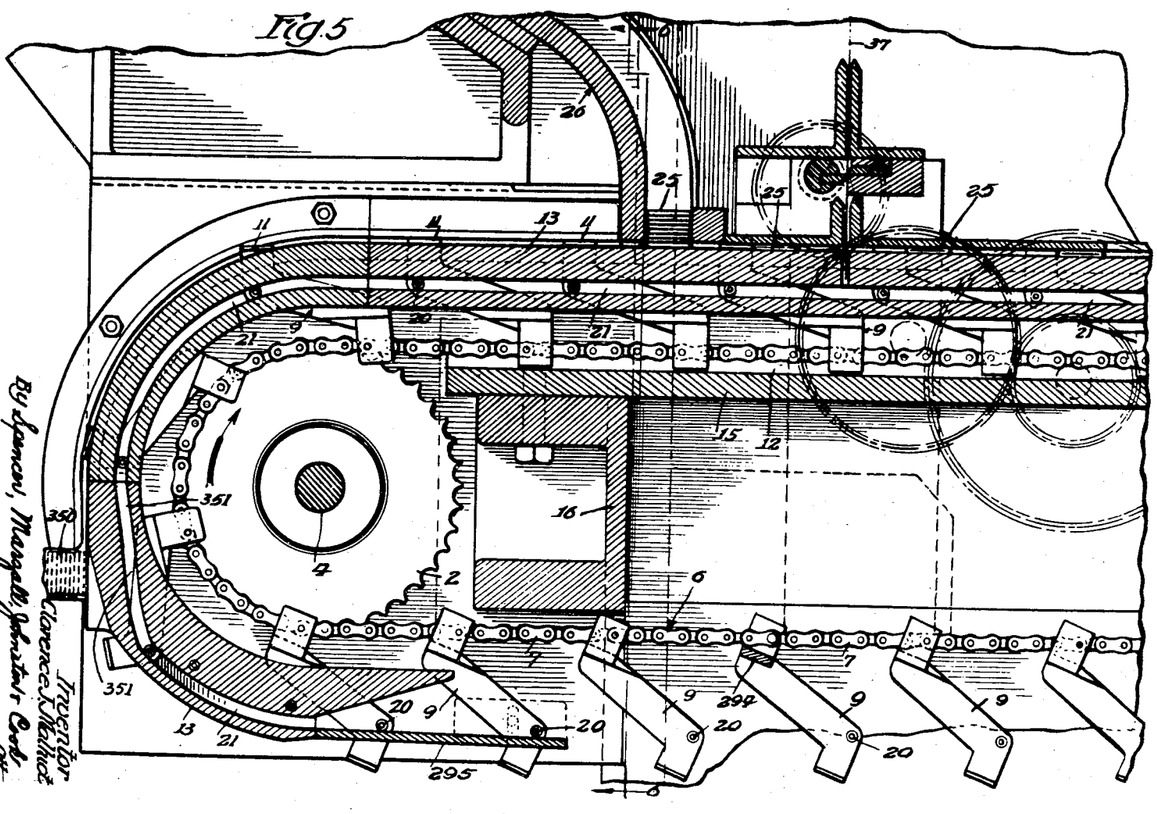
Fig. 5 is an enlarged fragmentary section taken along the line 5—5 of Fig. 3 and illustrating the mechanism at the feeding end of the machine.

During the return travel of the conveyor 6, the pushers 9 are allowed to drop to a free position as shown in Figs. 1, 2, 5 and 9. The downward drop of the pushers is limited by engagement of a cross bar 294 with the links of the conveyor chain as shown in Fig. 5. At the left hand end of the machine the pins 20 of the pushers are guided into the cam groove 21 by an adjustably mounted guide 295 also shown in Fig. 5. Proper tension in the conveyor chain 6 is maintained by a sprocket 297 carried by a pivotally mounted arm 298, Fig. 2.

Wrapping stations

The articles being wrapped are fed to the conveyor mechanism at an article feeding station 26. Thereafter the article is conveyed to a wrapper feed station 38, Fig. 1, where the wrapper is partially wrapped around the article. The article is then conveyed to numerous other folding, ironing, and wrapping stations where the article is completely wrapped. The details of the several stations are not disclosed in this application for the reason that they form no part in the present invention. For greater detail reference is made to the copending application Serial No. 442,205 of which this is a division.

Discharge mechanism

Figure 11:
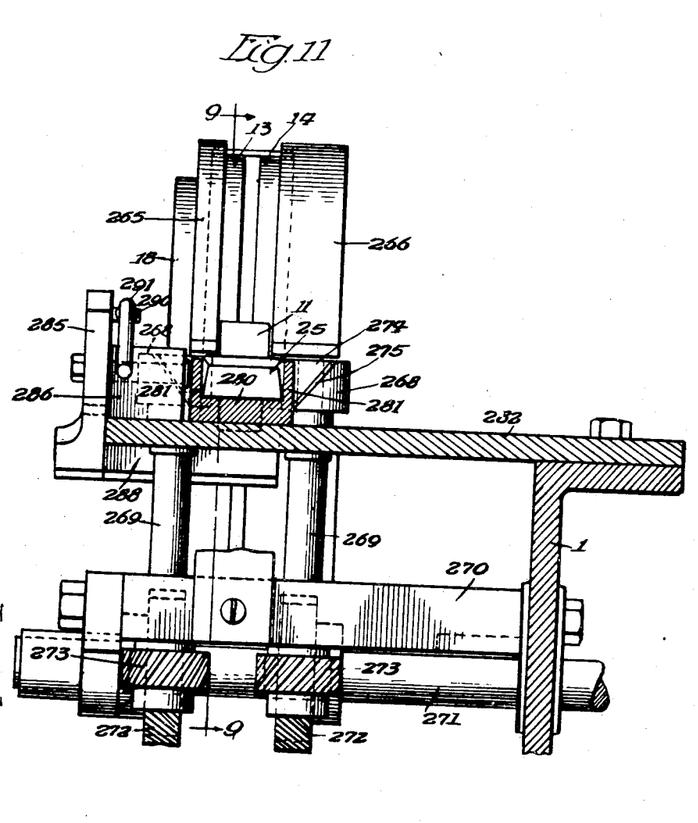
Fig. 11 is a transverse sectional detail taken on the line 11—11 of Fig. 9.

After the article has been completely wrapped at the various wrapping stations, the conveyor moves around the sprocket 3 at the right hand end of the machine and feeds the wrapped articles to a discharge apparatus best shown in Figs. 9 to 13. Discharge takes place at a position approximately 90° around the sprocket 3, whereby the wrapped article is discharged while standing substantially vertically on one of its side edges. During movement to the discharge position the article is guided by the supporting rails 13 and 14 which curve around the sprocket 3 as shown in Figs. 9 and 11. Curved top plates 265 and 266, Figs. 9, 10 and 11, maintain the articles on the rails 13 and 14 until the discharge position is reached. During movement of the articles around the upper curved portion of the guide rails, the pusher head 11 is maintained in constant engagement with the article by an upwardly inclined portion 267 of the cam track 21, Fig. 9.

The articles are discharged by means of a pair of rotary discharge members 268 which are mounted upon vertically extending shafts 269 rotatably supported by a bracket 270 bolted to the main frame of the machine. The discharge members 268 and shafts 269 are rotated in synchronism by means of a shaft 271 which is rotatably supported by frame 1 and bracket 270 and carries a pair of spiral gears 272. The spiral gears 272 mesh with spiral gears 273 attached to the shafts 269, thereby to effect rotation of the shafts 269 and rotary members 268 upon rotation of the shaft 271, Figs. 2, 9 and 11 to 13.

Each of the rotary discharge members 268 is provided with a peripheral cut-away portion 274 comprising a spiral track 275 and a pusher face 276. The discharge members 268 are rotated in the direction indicated by the arrows in Figs. 12 and 13. The wrapped article 25 is first received by the cut-away portion 274 as it is advanced downwardly by the pusher head 11. The timing of the parts is such that as the article travels downwardly into the cut-away portion 274, the leading or lower edge of the wrapped package is free of the track 275 by a small margin. A portion of the periphery of the discharge members 268 adjacent the track 275 is thereby provided to hold a previously ejected package clear of the discharge members to prevent it from falling back into the path of the oncoming package, until just prior to the time that the pusher face 276 contacts the oncoming package.

Figure 2:
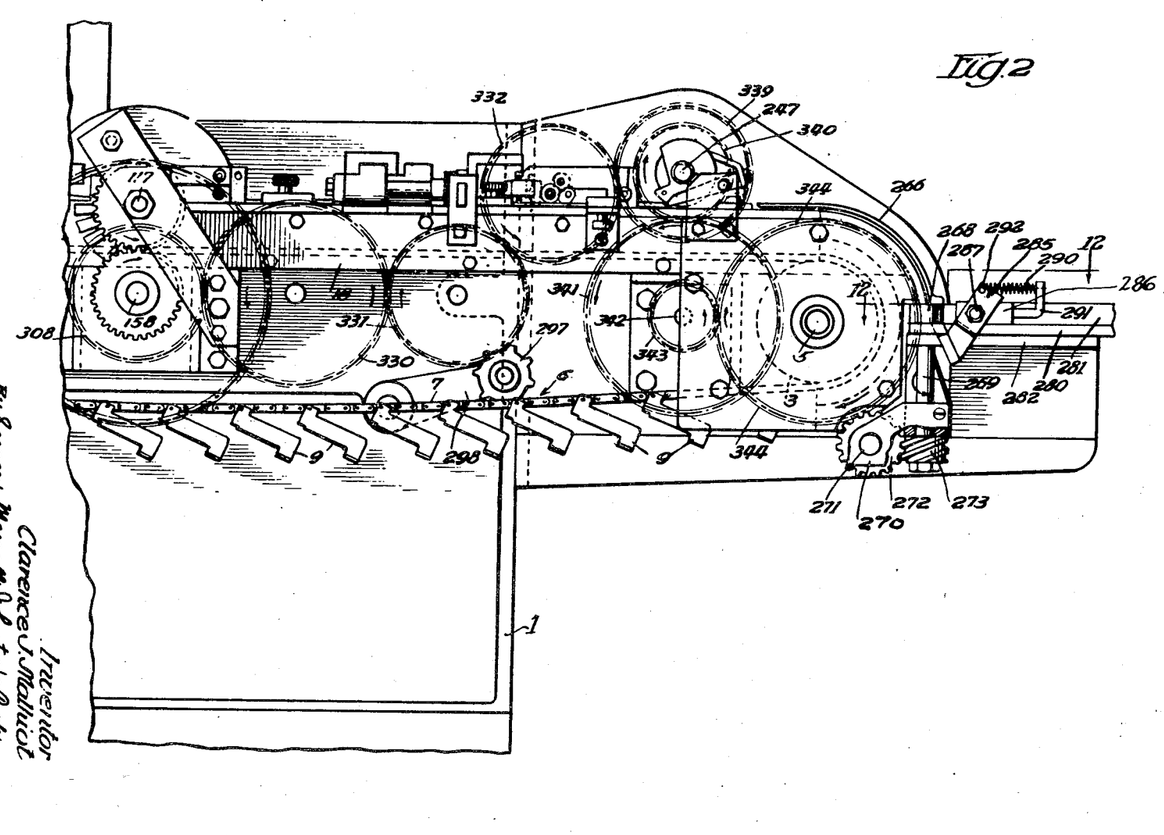
Fig. 2 is a front elevation of the right hand portion of the machine illustrated in Fig. 1, the two views partially overlapping.
Figure 3:
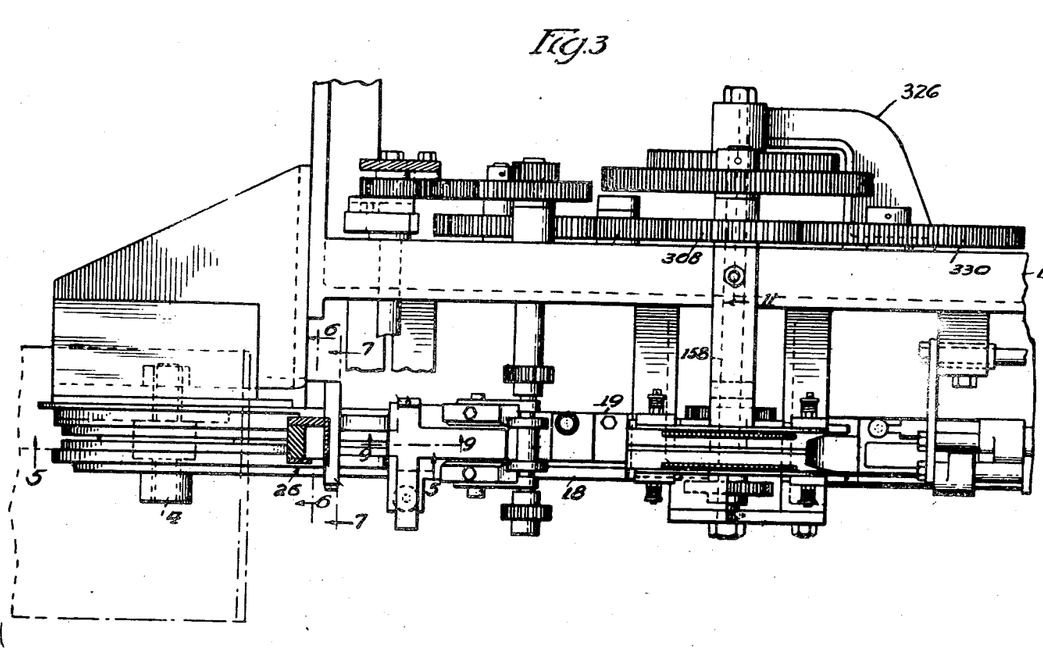
Fig. 3 is a plan view of the apparatus shown in Fig. 1, certain parts being omitted for clarity.
Figure 12:
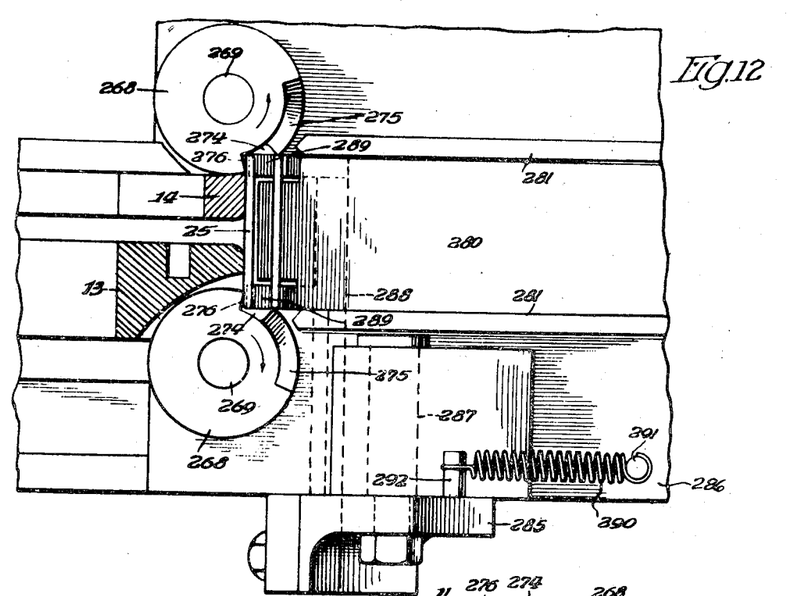
Fig. 12 is a horizontal sectional detail taken on the line 12—12 of Fig. 2 and illustrates the discharge mechanism for the articles.
Figure 13:
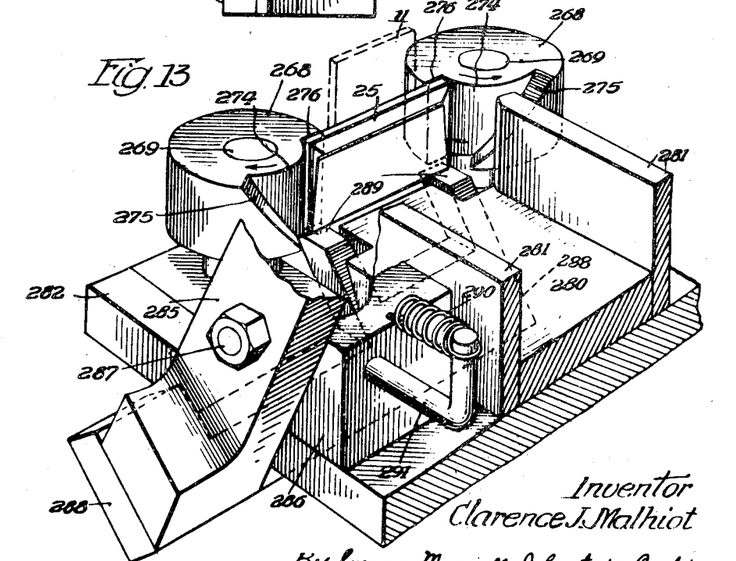
Fig. 13 is a perspective view illustrating the discharge mechanism for the articles.

Just as the article reaches the lower ends of the discharge members 268, Figs. 2, 12 and 13, it is engaged by the pusher faces 276 of the members 268 and is caused to move forwardly on a bottom plate 280 of a discharge chute comprising the bottom plate 280 and upwardly extending side walls 281. The article is thus removed from the pusher head 11 as the pushers 9 continue to move downwardly around the sprocket 4 and cam groove 21. The discharge trough for receiving the articles is mounted upon a bracket 282 which extends outwardly from the main frame, and the articles are advanced along the trough or chute by the successive pushing operations of the rotary discharge members 268.

A means is also provided for discharging broken or like articles which are not properly discharged by the rotary members 268, Figs. 12 and 13. This means comprises an arm 285 which is pivotally mounted on a block 286 by a pivot pin 287 and carries the chute bottom plate 280. The block 286 is mounted upon the bracket plate 282, and carries a plate member 288, which latter is provided with a pair of upwardly extending arms 289 which extend upwardly through suitable cut-away portions in the chute bottom plate 280 and receive the article 25 as it is advanced downwardly by the pushers 9 and rotary discharge members 268.

The bottom plate 280 of the discharge chute terminates in advance of the plane in which an article as it is fed downwardly by a pusher head 11, Figs. 12 and 13, and the article is, therefor, first received upon the arms 289. A spring 290 tensioned between a pin 291 mounted in the block 286 and a pin 292 mounted in the arm 285 normally urges the plate 288 and arms 289 upwardly so that the tops of the arms 289 normally lie in substantially the same plane as the top of the chute bottom 280. Should a broken or otherwise displaced article be received upon the tops of the arms 289 and not advanced forwardly by the discharge members 268, however, the arms 289 are adapted to move about the pivot 287 and permit the broken or displaced article to drop beneath the chute bottom 280 as a succeeding article is advanced by the conveyor chain. A guide 293, Fig. 9, causes the thus discharged articles to move away from the rotating parts of the discharge mechanism and these articles may be then received within a suitable receptacle, not shown.

Machine drive

Figure 1:
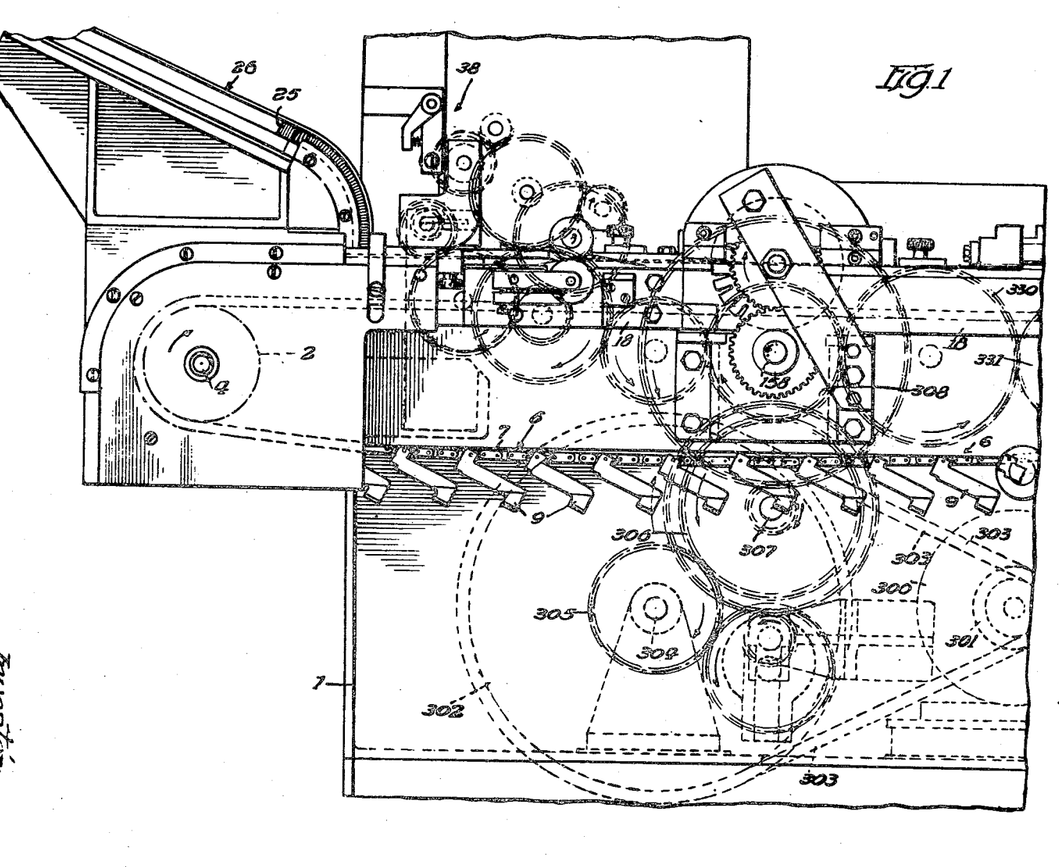
Fig. 1 is a front elevation of the left hand portion of a machine constructed in accordance with the present invention.

The article conveying mechanism is driven from a power source such as a motor 300, Fig. 1, the article conveying mechanism being coordinated with the other parts of the machine so as to operate the entire wrapping machine in proper timed relationship.

The motor 300 drives a pulley 301 which is connected with a pulley 302 by a belt 303. The pulley 302 is mounted on a main drive shaft 304 which has a gear 305 attached thereto. The gear 305 meshes with a gear 306 loosely mounted on a shaft 307. The gear 306 meshes with a gear 308 loosely mounted upon a shaft 158. The gear 308 meshes with an idler gear 330 which meshes with a gear 331. The gear 331 meshes with a gear 332 which is mounted on a shaft 333, Fig. 4. The gear 332 meshes with a gear 339 mounted upon a shaft 247. The shaft 247 carries a pinion 340 which meshes with a gear 341 rotatably mounted upon a shaft 342 located beneath the shaft 347. A pinion 343 is attached to the gear 341 and engages a gear 344 which is attached to the shaft 5 of the right hand sprocket wheel 3 and thereby drives the rotary conveyor chain 6, Figs. 2 and 4.

The gear 344 also meshes with a gear 345 mounted on the shaft 271 and thereby drives the rotary discharge members 268 in timed relation with the movement of the article conveyor, Figs. 2, 4 and 9.

Operation

The article chain 6 is continuously moved by the sprocket 3 and thereby continuously advances the pushers 9 and the pusher heads 11. The articles are advanced to the guide rails 13 and 14, along which the pusher heads travel, by means of a feeding chute 26. Alternatively the articles may be fed along a horizontally arranged chute 350, Fig. 5, the cam track 21 being provided with a portion 351 providing for proper feeding engagement of the pusher heads 11 with an article to be fed.

The articles are then fed to the several wrapping stations where the article is completely wrapped.

After being wrapped, the article is moved to discharge position in which the rotary discharge members 268 discharge each article from the conveyor 6 and move it into a discharge chute. In the event that an article is not properly advanced by the discharge members 268, the pivotally mounted arms 289 discharge the article downwardly beneath the normal discharge chute.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. In a wrapping machine, embodying a support for articles, conveyor means for moving articles along said support, and means for discharging wrapped articles from said support comprising a pair of rotary discharge members arranged adjacent opposite sides of an article on the support, each of said members being provided with a longitudinally extending slot for receiving articles longitudinally therein as the articles are moved by said conveyor means to enter the slot in a plane substantially parallel with the axes of said rotary members, and means coordinated with the movement of the articles for rotating said discharge members.

2. In a wrapping machine embodying a support for articles, continuously moving conveyor means for moving articles along said support, and means for discharging wrapped articles from said support during continuous movement of said conveyor means comprising a pair of rotary discharge members arranged adjacent opposite sides of an article on the support, each of said members being provided with a longitudinally extending slot for receiving articles longitudinally therein in a plane substantially parallel with the axes of said discharge members, as the articles are moved by the conveyor means, each of said slots being provided with an inclined surface for receiving and guiding articles during movement into the slot and with a relatively flat surface to engage and move the articles out of the rotary members, and means coordinated with the movement of the articles for rotating said rotary members.

3. In a wrapping machine a support for articles, conveyor means for moving articles along said support, means for discharging wrapped articles from said support onto a discharge chute, said means comprising a pair of rotary discharge members arranged adjacent opposite sides of an article on the support, each of said members being provided with a longitudinally extending slot for receiving articles longitudinally therein as the articles are moved by said conveyor means, means coordinated with the movement of the articles for rotating said discharge members, and means for separately discharging damaged articles including a pivotally mounted member for normally supporting articles adjacent said discharge chute, spring means urging said member to said supporting position, said member being movable about its pivot to permit discharge of damaged articles away from said chute.

4. Article conveying and discharging mechanism for discharging wrapped articles from a wrapping machine and comprising a pair of rotary discharge members arranged opposite lateral edges of an article to be discharged, each of said members being provided with a longitudinally extending slot for receiving opposite edges of articles longitudinally therein as the articles are moved into said rotary discharge members, a wall of said slot subsequently engaging a face of the article to advance it, means for moving the articles to the discharge members, and means coordinating the movement of the articles into contact with said rotary discharge members with the rotation of said discharge members.

5. Article conveying and discharging mechanism for discharging wrapped articles from a wrapping machine and comprising a pair of rotary discharge members arranged opposite lateral edges of an article to be discharged, each of said members including a longitudinally extending slot for receiving articles therein, a wall of the slot subsequently engaging a face of the article to advance it, means for moving the article to the said discharge members, each of said slots being provided with an inclined surface for receiving and guiding articles during movement into the slot and with a relatively flat surface adapted to move the articles out of the rotary members, and means coordinating the movement of the articles with the rotation of said rotary members.

6. Article conveying and discharging mechanism for discharging wrapped articles onto a discharge chute and comprising a pair of rotary members arranged adjacent opposite sides of the article to be discharged, each of said members being provided with means for discharging properly wrapped articles to a given position, means adapted to drive said discharge members in timed relation with the delivery of the wrapped articles to the discharge members, means for separately discharging damaged articles including a pivotally mounted member for normally supporting articles adjacent said discharge chute, and spring means urging said member to said supporting position, said member being movable about its pivot to permit discharge of damaged articles away from said chute, and means operating to deliver the article to the rotary members and to discharge the article past the said pivotally mounted member against the action of said spring, in the event that the article is not accepted by said rotary members for stacking.

7. In a wrapping machine, embodying means for conveying the articles, rotary discharge members for receiving the articles from the conveying means, said members being each provided with a slot extending lengthwise of its axis, one wall of the slot being inclined to guide the article into the slot, another wall of the slot adapted to engage a face of the article to advance it upon a receiving support, and means for rotating said members, a portion of the periphery of said rotating members operating to maintain an ejected article from falling back into the path of the next advancing article.

8. In a wrapping machine, embodying means for conveying the articles, rotary discharge members for receiving the articles from the conveying means, said members being each provided with a slot extending lengthwise of its axis, one wall of the slot being inclined to guide the article into the slot, another wall of the slot adapted to engage a face of the article to advance it upon a receiving support, and means for rotating said members, a portion of the periphery of said rotating members operating to maintain an ejected article from falling back into the path of the next advancing article, a portion of said support being yielding under pressure of an advancing article, in the event an article is not accepted by said rotary discharge members.

9. In a wrapping machine, embodying means for conveying the articles, rotary discharge members for receiving the articles from the conveying means, said members being each provided with a slot extending lengthwise of its axis, one wall of the slot being inclined to guide the article into the slot, another wall of the slot adapted to engage a face of the article to advance it upon a receiving support, and means for rotating said members, a portion of the periphery of said rotating members operating to maintain an ejected article from falling back into the path of the next advancing article, a portion of said support being yielding under pressure of an advancing article, in the event an article is not accepted by said rotary discharge members, the said yielding support forming an extension of a main support and upon which yielding support the article is first delivered.

10. In a wrapping machine, embodying a conveyor for the articles, rotary delivery members for receiving the articles from the conveyor, article engaging elements on the conveyor for advancing the articles, said members having slots for receiving the articles, a wall of said slot operating to engage a face of the article to advance it, a support for receiving the article from said delivery members and spaced therefrom, and a yieldable support disposed between the first said support and the rotary delivery members and upon which yieldable support the articles are first delivered to be moved by said members along the first said support, said yieldable support yielding to discharge an article which is not accepted by said rotary members for stacking.

11. In a wrapping machine, embodying a conveyor for the articles, rotary delivery members for receiving the articles from the conveyor, article engaging elements on the conveyor for advancing the articles, said members having slots for receiving the articles, a wall of said slot operating to engage a face of the article to advance it, another wall of said slot adapted to engage a face of the article to advance it, a support for receiving the article from said delivery members and spaced therefrom, and a yieldable support disposed between the first said support and the rotary delivery members and upon which yieldable support the articles are first delivered to be moved by said members along the first said support, said yieldable support yielding to discharge an article which is not accepted by said rotary members for stacking.

12. In a wrapping machine, embodying a conveyor for the articles, rotary delivery members for receiving the articles from the conveyor, article engaging elements on the conveyor for advancing the articles, said members having slots for receiving the articles, a wall of said slot operating to engage a face of the article to advance it, a support for receiving the article from said delivery members and spaced therefrom, a yieldable support disposed between the first said support and the rotary delivery members and upon which yieldable support the articles are first delivered to be moved by said members along the first said support, said yieldable support yielding to discharge an article which is not accepted by said rotary members for stacking, said yieldable support being pivotally mounted, and resilient means tending normally to maintain it in article receiving position with respect to the other of said supports.

13. For use in an article feeding mechanism, article delivery means embodying two co-operating, laterally spaced, substantially cylindrical members rotatable about parallel axes, each provided with a slot in its periphery extending in a direction lengthwise of its axis of rotation, one wall of said slot being inclined to the axis of the member, to be engaged by an article whereby to guide the article into the slot, another wall of the slot adapted to engage a face of the article to discharge the article from the slot.

14. For use in an article feeding mechanism, article delivery means embodying two co-operating, laterally spaced, substantially cylindrical members rotatable about parallel axes, each provided with a slot in its periphery extending in a direction lengthwise of its axis of rotation, one wall of said slot being inclined to the axis of the member, to be engaged by an article whereby to guide the article into the slot in a direction lengthwise of the axis of said member, another wall of the slot adapted to engage a face of the article to discharge the article in a direction laterally with respect to the axis of rotation of said member, from the slot.

15. In an article feeding machine, a conveyor for the articles, a yieldable article support against which the conveyor operates, a pair of members rotatable about upright axes, each of said members having a slot in its periphery extending in a direction lengthwise of the axis for receiving the articles, one wall of the slot being inclined to guide an edge of an article into the slot, another wall of the slot forming a shoulder to engage a face of the article to deliver it laterally from said slot, the end of the slot at the base of said inclined wall being open, and through which open end articles not accepted by said rotary members for stacking, will be discharged, said yieldable article support being disposed adjacent said slot.

16. In an article feeding machine, a conveyor for the articles, a pair of members rotatable about upright axes, each of said members having a slot in its periphery extending in a direction lengthwise of the axis thereof, one wall of the slot being inclined to guide an edge of an article into the slot, another wall of the slot forming a shoulder to engage a face of the article to deliver it laterally from said slot, the end of the slot at the base of said inclined wall being open, through which open end articles not accepted by said rotary members for stacking, will be discharged, and means adjacent said opening forming a yieldable support for receiving the articles as they are delivered from said slot.

17. Article conveying and discharging mechanism for discharging wrapped articles to discharge position and comprising operable discharge members arranged adjacent opposite sides of the articles to be discharged, each of said discharging members being provided with means for discharging properly wrapped articles to a given position, means adapted to drive said discharging members in timed relation with the delivery of the wrapped articles to the discharge members, and additional means for separately discharging damaged articles, said additional means embodying an operable member for normally supporting articles adjacent a given position and upon which operable member the articles are successively moved to position to be supported thereby, urging means for urging said operable member toward said supporting position, said operable member being shiftable against the stress of the urging means by an advancing article engaging a damaged article that is upon said operable member and forcing the damaged article to shift the operable member to a position to permit discharge of the damaged article away from said given position.

CLARENCE J. MALHIOT.

REFERENCES CITED

The following references are of record in the file of this patent:

UNITED STATES PATENTS

| Number | Name | Date |
|---|---|---|
| 1,210,440 | Elliott | Jan. 2, 1917 |
| 1,425,997 | Milmoe | Aug. 15, 1922 |
| 1,942,267 | Warren | Jan. 2, 1934 |
| 1,971,574 | Moon | Aug. 28, 1934 |
| 2,010,190 | Jahne | Aug. 6, 1935 |
| 2,235,900 | Nolan | Mar. 25, 1941 |
| 2,241,116 | Chalmers | May 6, 1941 |
| 2,247,175 | Ostrom | June 24, 1941 |

FOREIGN PATENTS

| Number | Country | Date |
|---|---|---|
| 492,104 | Germany | Feb. 22, 1930 |